Feb. 17, 1942. J. M. BING 2,273,429
PHOTOGRAPHIC CAMERA WITH BUILT-IN EXPOSURE METER
Filed March 11, 1940 2 Sheets-Sheet 1

FIG.3-A.

INVENTOR.
JOSEPH M. BING
BY
ATTORNEY.

Feb. 17, 1942.  J. M. BING  2,273,429
PHOTOGRAPHIC CAMERA WITH BUILT-IN EXPOSURE METER
Filed March 11, 1940  2 Sheets-Sheet 2

INVENTOR.
JOSEPH M. BING
BY
ATTORNEY.

Patented Feb. 17, 1942

2,273,429

UNITED STATES PATENT OFFICE 2,273,429

PHOTOGRAPHIC CAMERA WITH BUILT-IN EXPOSURE METER

Joseph M. Bing, New York, N. Y.

Application March 11, 1940, Serial No. 323,250

13 Claims. (Cl. 95—10)

This application is a continuation in part of application Serial No. 216,894, filed July 1, 1938, entitled Photographic exposure meter, now Patent 2,195,640 of April 2, 1940.

The present invention relates to exposure meters for photographic cameras, more particularly to cameras having an exposure meter permanently combined therewith and operatively connected to an exposure control element of the camera.

More specifically the invention is concerned with optical exposure meters based on the extinction principle and comprising substantially an element known as graduated or step wedge having a plurality of fields of varying light stopping property or density, each field being provided with a distinct index or calibration mark. The mark just readable, if the entire element is subjected to transillumination by light rays reflected from an object or scene to be photographed, is representative of the existing scene or object brightness determining the required exposure adjustment for the camera.

An object of the invention is to provide a combination camera and exposure meter of the above type enabling a practically instantaneous adjustment of an exposure control element of the camera for a given scene or object brightness and other predetermined exposure determining conditions.

Another object is the provision of a combined camera and exposure meter of the above type, wherein the exposure meter has an adjusting element physically connected therewith and adapted to set an exposure control element of the camera in accordance with a light measurement made and under predetermined other exposure control conditions.

Figure 1:
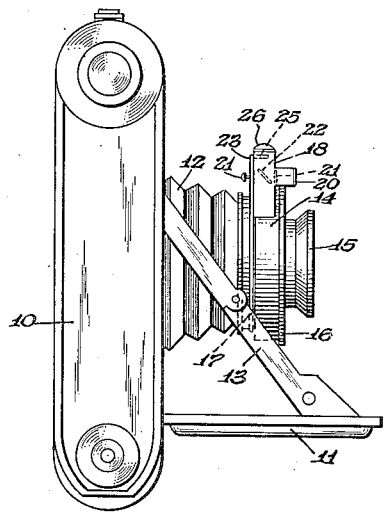
Figure 2:
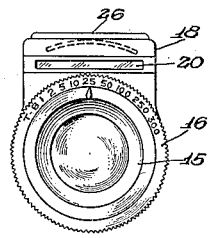
Figure 3:
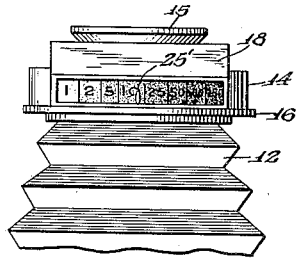
Figure 3:
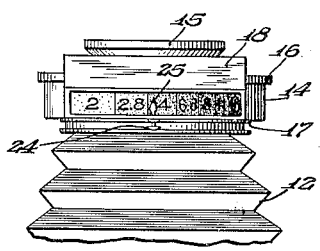
Figure 4:
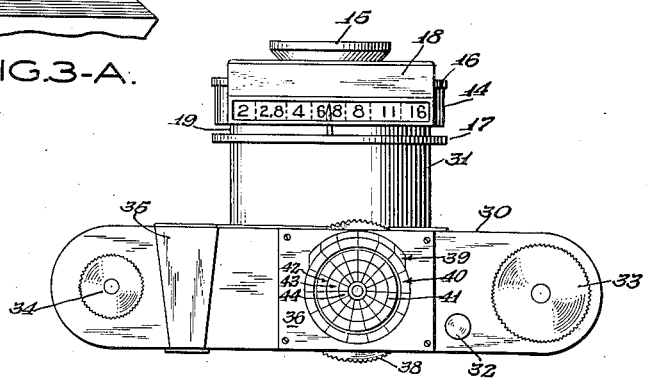
Figure 5:
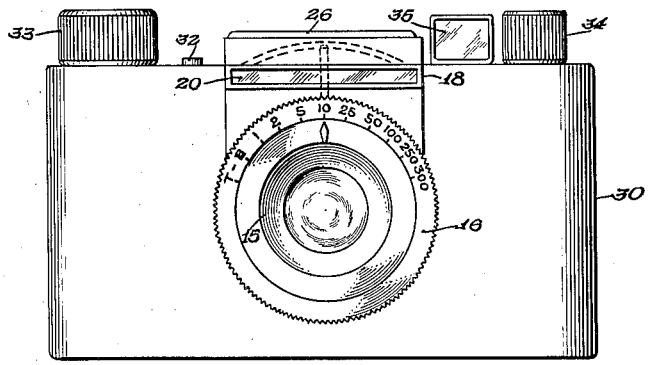
Figure 6:
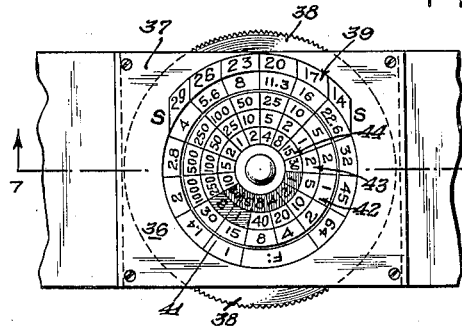
Figure 7:
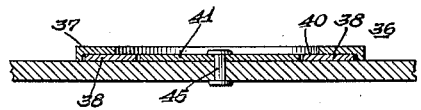
Figure 8:
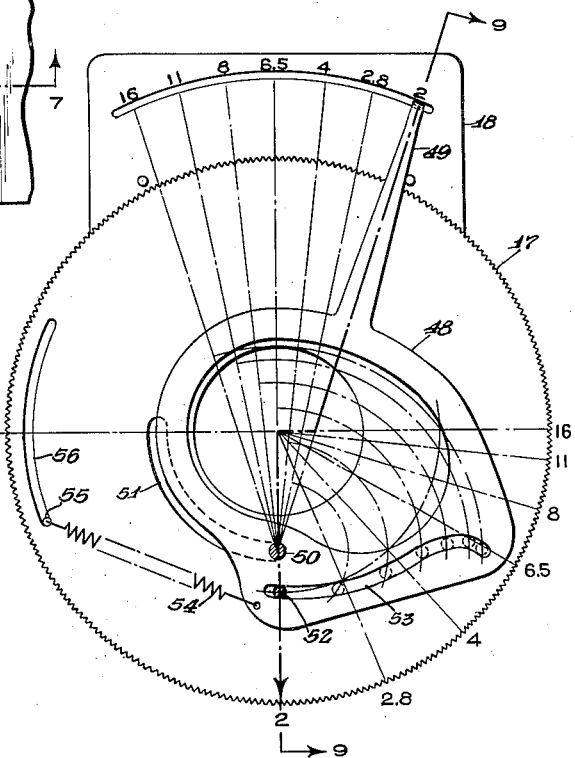
Figure 9:
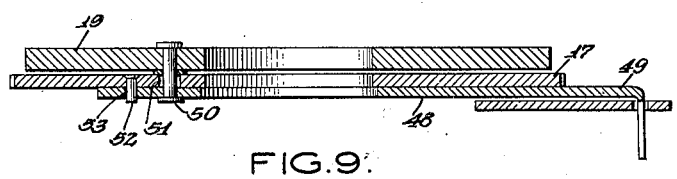

Further objects and aspects of the invention will become more apparent from the following detailed description taken with reference to the accompanying drawings forming part of this specification and wherein:

Figure 1 is a side view of a camera of the folding bellows type equipped with a built-in exposure meter in accordance with the invention, Figure 2 is a partial front view of Figure 1 showing the lens and shutter casing and exposure meter mounting, Figure 3 is a partial top view of Figure 2 on an enlarged scale, Figure 3A is a view similar to Figure 3 showing a modification thereof, Figure 4 is a top view of a camera of the miniature type equipped with a built-in exposure meter and a computer associated therewith in accordance with the invention, Figure 5 is a front view of the camera shown in Figure 4, Figure 6 is an enlarged partial view of Figure 4 showing the computer in greater detail, Figure 7 is a cross section taken on line 7—7 of Figure 6, Figure 8 is a schematic diagram illustrating a modification of an exposure meter coupling according to the invention, and Figure 9 is a cross section taken on line 9—9 of Figure 8.

Like reference characters identify like parts throughout the different views of the drawings.

Referring more particularly to Figures 1 to 3, there is shown a camera of the drop bed-folding bellows type of well known design, comprising a main camera body 10, a hinged base or drop bed 11 connected to the body 10 by means of a linkage system 13, and a circular lens mount and shutter casing 14 carrying a lens 15 and being connected to the body 10 through a light-tight collapsible bellows 12. Item 16 is the usual exposure time setting ring arranged at the front of the shutter casing 14 and item 17 is a disc adjustable by a knob or pointer to control the lens aperture or opening of the iris diaphragm mounted within the casing 14 in a manner well known and not shown as being immaterial for the understanding of the present invention.

The exposure meter in accordance with the invention is mounted on top of the shutter casing 14 and in the example shown comprises a flat casing 18 having a horizontal part provided at its front with a light admitting opening preferably covered by a transparent or translucent plate 20 and facing in the same direction as the lens 15 of the camera, and a vertical rear portion facing in an upward direction. There is further shown a wedge element 21 mounted within the horizontal portion of the casing at a suitable distance from the light admitting opening 20. The wedge 21 is designed to have a density or light transmitting property varying gradually or step-by-step from one end to the other, as shown more clearly in Figure 3, and is provided with a series of consecutive marks forming a calibration scale representing camera exposure values, in the example shown the scale of lens aperture or stop numbers from 2 to 16 according to the well known F-system. In practice it was found advantageous to make the entire wedge opaque except for the calibration marks assuming the form of stencils of increasingly varying density as described in detail in the above-mentioned parent application.

In order to enable viewing of the wedge 21 from above there is provided a mirror 22 or an equivalent deflecting element arranged at an angle of 45 degrees to the direction of the light rays entering the forward end or opening of the exposure meter casing.

In order to keep the size of the exposure meter within small limits a cylindrical magnifying lens 26 may be mounted at the upper end of the vertical portion of the meter casing.

Numeral 23 is an extension of the lens aperture adjusting member having its upper end bent at a right angle as shown at 25 to serve as a pointer or index member arranged to move within a slot in the vertical rear wall of the meter casing and cooperating with the calibration marks, i. e. in the example shown the scale of lens aperture numbers on the graduated wedge appearing in the viewing slot.

For semi-automatic operating the meter and associated camera are suitably designed for a fixed shutter speed, such as $\frac{1}{25}$ sec. corresponding to the most popular and widely used exposure time for making snap shots without having to place the camera on a fixed support, as well as for a given average emulsion speed such as 23° Scheiner for films at present available on the market. Moreover, automatic operation to be described is limited to scenes under substantially favorable light conditions such as on sunny days or with only lightly clouded sky, i. e. the normal conditions prevailing in the large majority of cases for pictures taken by the average camera owner. Under conditions differing substantially from those aforementioned resort should be had to a computer or calculator suitably mounted on the camera near the viewing slot of the exposure meter, said computer comprising a plurality of conversion scales at least one of which is substantially identical to the scale on the step wedge of the exposure meter to afford a substantially instantaneous conversion of a light value read into appropriate coordinated exposure data under exceptional and abnormal light conditions as will be described in greater detail hereafter.

Alternatively, a varying film speed may be taken into consideration by employing different shutter speeds for different type films according to instructions to be supplied by the manufacturer. Thus when using a film with a relatively low speed, say about 23° Sch. the shutter may be set at $\frac{1}{25}$ sec.; for film of medium speed, say about 26° Sch. $\frac{1}{50}$ of a second shutter speed may be used and for relatively high speed films, say about 29° Sch. the shutter may be set at $\frac{1}{100}$ sec.

The operation for automatic adjustment under the above normal conditions is as follows: After the proper exposure time has been adjusted by setting the exposure control ring 16, the camera is held with the lens 15 and opening 20 facing the object or scene to be photographed and the extension lever 23 moved by the aid of a knob 21 or the like to overlie the faintest or dimmest stop number just readable without effort in the viewing slot of the exposure meter in a manner substantially similar to that described in the parent application. As a result of this adjustment the stop or lens aperture is automatically set to its proper value for a given scene or object brightness. As is well known the movement of the stop or diaphragm adjusting element in photographic cameras follows a non-linear relation, if the amount of light passing the camera lens is to be varied by the same factor by each step and in order to establish a proper relation between the iris setting and the exposure meter scale, the stop numbers in the reading slot or the scale divisions of varying density in accordance with one modification of the invention are suitably spaced non-linearly corresponding to the calibration of the stop scale for the particular camera embodying the exposure meter as seen in Figure 3. Alternatively, a suitable coupling mechanism may be provided between the stop setting member and the pointer 23 cooperating with the exposure meter scale on the graduated wedge designed in such a manner as to equalize the movement of the pointer as will become more apparent from Figure 8 to be described presently.

As is understood, in place of the stop numbers, the step wedge may be calibrated in exposure time values such as shown on the exposure setting ring 16, Figure 2, in which case the pointer 23 is suitably connected or coupled with the exposure time setting ring 16 in such a manner that with a properly selected average stop or lens aperture, say about F:6.3, for a given emulsion speed the requisite exposure time is automatically adjusted to its proper value by moving the pointer 23 to a point overlying the faintest number just readable in the viewing slot.

An arrangement of this type is shown in Figure 3A which differs from Figure 3 mainly by the fact that the step wedge is calibrated in exposure times, in the example shown from $\frac{1}{250}$ sec. to 1 sec., with the index or pointer 25' cooperating with the step wedge scale being coupled to the exposure setting ring 16 which in this case is advantageously arranged at the rear end of the shutter casing 14. The lens aperture adjusting member in this case may be arranged at the front side of the casing 14 to cooperate with an aperture scale (not shown) as will be readily understood. Arrangements of the type according to Figure 3A have the advantage that the shutter speed scale is inherently uniform resulting in an even scale division on the step wedge and preventing crowding of the scale numbers.

As is understood, the automatic adjustment in the case of Figure 3A applies to a definite average lens aperture such as F:6.3, as pointed out, as well as to a predetermined film speed. For other abnormal conditions a computer may be consulted having a scale substantially identical to the shutter speed scale on the step wedge as will be further understood from the following.

An exposure setting arrangement as described may also be advantageously incorporated in a moving picture camera in which case the exposure time or number of frames per second is a constant and the proper stop or lens aperture may be automatically adjusted for a given emulsion speed in the manner described hereinabove.

As is understood, the exposure meter is advantageously designed in such a manner as to have an acceptance angle or field of view being substantially equal to or preferably less than the field of view embraced by the camera lens to cause only light rays emanating from the subject of scene to be photographed to affect the meter reading, if the camera is pointed toward the object scene.

Referring to Figures 4 and 5, there is shown schematically a camera of the well known miniature type equipped with an exposure meter permanently combined therewith in accordance with the invention. Numeral 30 represents the camera body provided with a tubular extension which may be collapsible or rigid and carries the lens mount and/or shutter casing 14 at its front end. Item 32 represents a shutter release button mounted on the camera body in accordance with standard practice. 33 is the film winding knob, 34 is the rewinding knob and 35 a direct view finder of the telescopic type, these elements being all of standard design and well known in the camera art. The stop or lens aperture in the example shown is adjusted by the aid of a knurled setting ring 17 arranged at the rear end of the shutter casing 14 and having an extension forming a pointer cooperating with the exposure meter scale in substantially the same manner as shown in the preceding figures.

In order to convert a reading taken on the graduated step wedge under abnormal or exceptional light conditions, there is provided in accordance with a further feature a computer or calculating device 36 mounted in the example shown on the top of the camera body 30, i. e. as close as possible to the viewing slot of the exposure meter to enable a substantially instantaneous conversion of a light reading taken without having to change the position of the camera.

The construction of the computer 36, which may be substantially similar to that described in the parent application, is shown in greater detail in Figures 6 and 7. In the latter numeral 37 is a mounting plate having a circular opening and being secured to the top wall of the camera casing. The plate serves to hold a rotatable, annular shaped, knurled scale member 38. A further disc shaped scale member is arranged within the member 38 and fixedly secured, such as by means of rivet 45, to the camera body. The plate 37 is provided with a sector shaped scale 39 calibrated in emulsion or film speed values, such as in degrees Scheiner as shown in the drawings. The rotating member 38 is provided with a scale 41 calibrated in stop or lens aperture numbers adjacent to and cooperating with the scale 39 and being substantially identical to the scale on the step wedge appearing in the viewing slot of the exposure meter. The central fixed scale member 41 in the example shown is provided with three concentric, staggered scales 42, 43, and 44 calibrated in shutter speed values, each of said staggered scales being for use under different average light condition to take into consideration the varying eye sensitivity in substantially the same manner as described in the parent application.

In operation at first the faintest number just being readable in the viewing slot is ascertained and the same number on the scale 41 and the disc 38 rotated until the corresponding number of scale 41 is opposite the number representing the film speed used. As a result of this setting the shutter speed scales 42, 43, and 44 are properly aligned with the stop or lens aperture scale 41, whereby any two desired coordinated values can be directly ascertained under any existing average light condition in a manner as described in greater detail in the parent application.

In Figure 4 the numbers on the step wedge are shown to be spaced substantially equally to prevent crowding at the end of the scale as in the case of Figure 3 and to facilitate the reading and operation of the meter. In this case, as pointed out, it is necessary to provide means for converting the substantially non-linear scale of consecutive stop numbers for uniformly varying the camera lens apertures into a substantially uniform scale employed for the step wedge. A suitable mechanism of this character is shown schematically in Figures 8 and 9. In the latter 17 represents the lens aperture adjusting ring for the camera and 48 is a cam formed with an extending pointer 49 arranged to move within the slot in the exposure meter casing and to cooperate with the numbers on the step wedge in a manner substantially similar to that described hereinabove. The cam 48 is pivoted excentrically to the disc 17 about a shaft 50 fixedly connected to the base plate or support 19 and frictionally engaging the cam 48. To enable rotation of the disc 17 the latter is formed with a slot 51. The cam 48 has a slot 53 through which passes a pin 52 fixedly secured to the disc 17. A coil spring or the like has one end secured to the cam 8 and has its opposite end secured to a pin 55 extending from the base 19 and arranged to move within a slot 56 in the disc 17. As is seen in an arrangement of this type the pin 52 rotating with the disc 17 will cause the cam and with it the pointer 49 to rotate, the relation between the movements of disc 17 and the cam 48 being determined by the shape of the slot 53. In this manner, by proper design of the slot 53, the non-linear movement of the disc 17 is equalized in such a manner as to secure a substantially linear scale division on the graduated step wedge.

It will be evident from the foregoing that the invention is not limited to the specific details and arrangements of parts shown and disclosed herein for illustration, but that the novel underlying thought and principle of the invention are susceptible of numerous variations and modifications coming within the broader scope and spirit of the invention as defined in the ensuing claims. The specification and drawings are accordingly to be regarded in an illustrative rather than in a limiting sense.

I claim:

1. The combination with a photographic camera having an exposure control element and an adjusting member therefor, of an exposure meter structurally combined with said camera, said exposure meter comprising a casing provided with a pair of openings forming a light passage therebetween, an optical wedge element provided with a series of distinct marks constituting an adjusting scale for said exposure control element and being of gradually varying transparency from one to the other end of the scale, said wedge element being mounted within said casing at a point intermediate said openings, whereby, by holding the camera with one of the openings of said meter facing a photographic scene, the distance from one end of said wedge of the dimmest mark being just barely visible by viewing the other opening is representative of the existing scene brightness, said adjusting member having an index arranged adjacent to and movable along the scale on said wedge element.

2. The combination with a photographic camera having an exposure control element and an adjusting member therefor, of an exposure meter structurally combined with said camera, said exposure meter comprising a casing provided with a pair of openings forming a light passage therebetween, an optical wedge element provided with a series of distinct marks of gradually varying transparency from one end to the other end of said wedge, said wedge element being mounted within said casing at a point intermediate said openings, whereby, by holding the camera with one of the openings of said meter facing a photographic scene, whereby the distance from one end of said wedge of the dimmest mark being just barely visible by viewing the other opening is representative of the existing scene brightness, said exposure meter having a field of view corresponding substantially to the view angle of said camera, said adjusting member having an index arranged adjacent to and movable along the scale on said wedge element.

3. The combination with a photographic camera having lens aperture control means, of an exposure meter structurally combined with said camera, said exposure meter comprising a casing provided with a pair of openings forming a light passage therebetween, an optical wedge element provided with a scale of lens aperture numbers of increasing transparency from one end to the other end of the scale, said wedge being mounted within said casing at a point intermediate said openings, whereby by holding the camera, with one of the openings of said meter facing a photographic scene, whereby the distance from end of said wedge of the dimmest number being just barely visible by viewing the other opening is representative of the existing scene brightness, an adjusting member for said aperture control means, and index means associated with said adjusting member and arranged adjacent to and movable along the scale on said wedge element.

4. The combination with a photographic camera having at least one exposure control element and an adjusting member therefor of an exposure meter structurally combined with said camera, said exposure meter comprising a casing provided with a pair of openings forming a light passage therebetween, an optical wedge element provided with a series of distinct marks constituting an adjusting scale for said exposure control element and being of gradually varying transparency from one end to the other end of the scale, said wedge element being mounted within said casing at a point intermediate said openings, whereby, by holding the camera with one of the openings of said meter facing a photographic scene, whereby the distance from one end of said wedge of the dimmest mark being just barely visible by viewing the other opening is representative of the existing scene brightness, said adjusting member having an index arranged adjacent to and movable along the scale on said wedge element, whereby setting said adjusting member to the dimmest number visible will result in proper adjustment of said exposure control element under predetermined exposure controlling conditions, and a computer mounted upon said camera on the side of the viewing opening of said exposure meter, said computer having relatively adjustable scale members, one of said scale members being provided with a scale substantially identical to the scale on said wedge element, said computer being adapted to convert a read scene brightness into appropriate exposure data onder conditions other than said predetermined exposure controlling conditions.

5. The combination with a photographic camera having lens aperture control means, of an exposure meter structurally combined with said camera, said exposure meter comprising a casing provided with a pair of openings forming a light passage therebetween, an oblong optical wedge element having a series of areas of gradually increasing transparency from one end to the other end of the scale, said wedge being mounted within said casing at a point intermediate said openings, whereby, by holding the camera with one of said openings facing a photographic scene, whereby the distance from one end of said wedge of the dimmest area being just barely visible by viewing the other opening is representative of the existing scene brightness, an adjusting member for said aperture control means, and index means associated with said adjusting member and arranged adjacent to and movable along said wedge element.

6. The combination with a photographic camera having lens aperture control means, of an exposure meter structurally combined with said camera, said exposure meter comprising a casing provided with a pair of openings forming a light passage therebetween, an oblong optical wedge element provided with a series of substantially uniformly spaced areas of gradually increasing transparency from one end to the other end of said wedge, said wedge being mounted within said casing at a point intermediate said openings, whereby, by holding the camera with one of said openings facing a photographic scene, whereby the distance from one end of said wedge of the dimmest area on said wedge being just barely visible by viewing the other opening is representative of the existing scene brightness, an adjusting member for said aperture control means, index means arranged adjacent to and movable along said wedge element, and motion equalizing means between said control and index means to correlate non-uniform adjustment of said control means to effect variation by an equal factor of the lens aperture when moving said index means from one area to the succeeding area of said wedge element.

7. The combination with a photographic camera having lens aperture control means, of an exposure meter structurally combined with said camera, said exposure meter comprising a casing provided with a pair of openings forming a light passage therebetween, an oblong optical wedge element provided with a series of substantially uniformly spaced areas of gradually increasing transparency from one end to the other end of said wedge, said wedge being mounted within said casing at a point intermediate said openings, whereby, by holding the camera with one of said openings facing a photographic scene, whereby the distance from one end of said wedge of the dimmest area on said wedge being just barely visible by viewing the other opening is representative of the existing scene brightness, an adjusting member for said aperture control means, index means arranged adjacent to and movable along said wedge element, and a cam mechanism adapted to impart movement from said control means to said index means to compensate non-uniform adjustment of said control means to effect variations by equal factors of the lens aperture with the uniform movement when passing from one area to the succeeding area of said wedge element.

8. The combination with a photographic camera comprising a camera body, a lens mount connected to said body by a light proof extension chamber, and a lens aperture control element embodied in said lens mount, of an exposure meter permanently mounted on the top of said lens mount, said exposure meter comprising a casing provided with a pair of openings forming a light passage therebetween, an optical wedge element provided with a series of areas of gradually increasing transparency from one end to the other end of said wedge, said wedge element being mounted within said casing at a point intermediate said openings, whereby by holding the camera, with one of the openings of said meter facing a photographic scene, whereby the distance from one end of said wedge of the dimmest area being just barely visible by viewing the other opening is representative of the existing scene brightness, and index means associated with said aperture control element and arranged adjacent to and movable along said wedge element.

9. The combination with a photographic camera comprising a camera body, a lens and shutter casing connected to said body by a light proof extension chamber and including exposure control means, of an exposure meter comprising a casing provided with a pair of openings forming a light passage therebetween, an optical wedge element provided with a series of marks constituting a scale of exposure control numbers for said exposure control means and being of gradually increasing transparency from one end to the other end of said scale, said wedge element being mounted within said casing at a point intermediate said openings, whereby, by holding the camera with one of the openings of said meter facing a photographic scene, whereby the distance from one end of said wedge of the dimmest mark being just barely visible by viewing the other opening is representative of the existing scene brightness, and index means for said exposure control means arranged adjacent to and movable along said wedge element.

10. In a combined camera and exposure meter as claimed in claim 9, said casing having a horizontal and a vertical portion and a reflecting member to reflect light rays entering the horizontal portion in a direction towards said vertical portion.

11. In a combined camera and exposure meter as claimed in claim 9, said casing having a horizontal and a vertical portion and a reflecting member to reflect light rays entering the horizontal portion in a direction towards said vertical portion, said wedge element being mounted in the horizontal portion of said casing.

12. In a combined camera and exposure meter as claimed in claim 9, said casing having a horizontal and a vertical portion and a reflecting member to reflect light rays entering the horizontal portion in a direction towards said vertical portion, said index means comprising a pointer coupled with said exposure control means and having a bent end portion arranged to move within a slot in the vertical portion of said casing.

13. The combination with a photographic camera comprising exposure control means, of an exposure meter permanently combined with said camera and comprising an optical wedge element provided with a series of adjacent fields of gradually increasing transparency from one end to the other end of said element, whereby, the distance from one end of said wedge of the dimmest field just barely visible by transillumination of said wedge by light rays reflected from a photographic scene is representative of the existing scene brightness, and index means for said exposure control means arranged adjacent to and movable along said adjusting scale.

JOSEPH M. BING.